Figure 3:
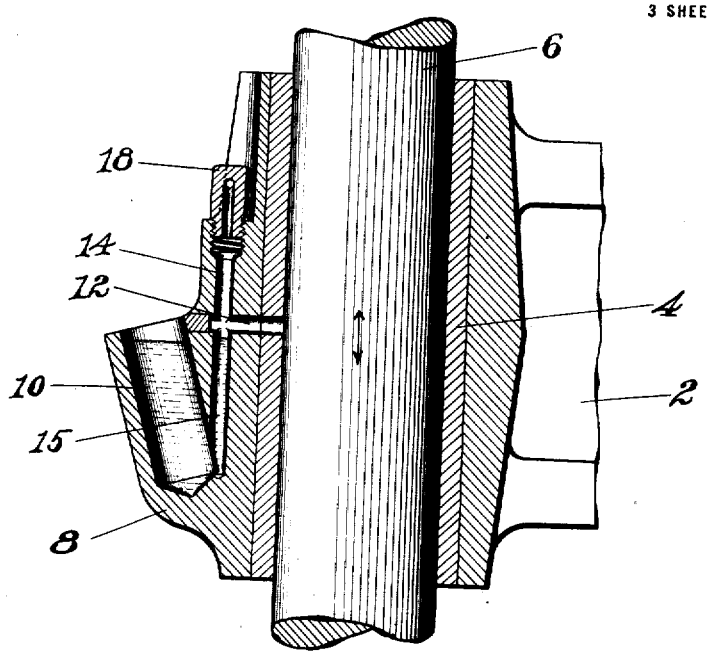

A. M. ALEXANDER.
METHOD OF LUBRICATING FRICTION SURFACES.
APPLICATION FILED MAR. 13, 1912.

1,157,358.

Patented Oct. 19, 1915.
3 SHEETS—SHEET 1.

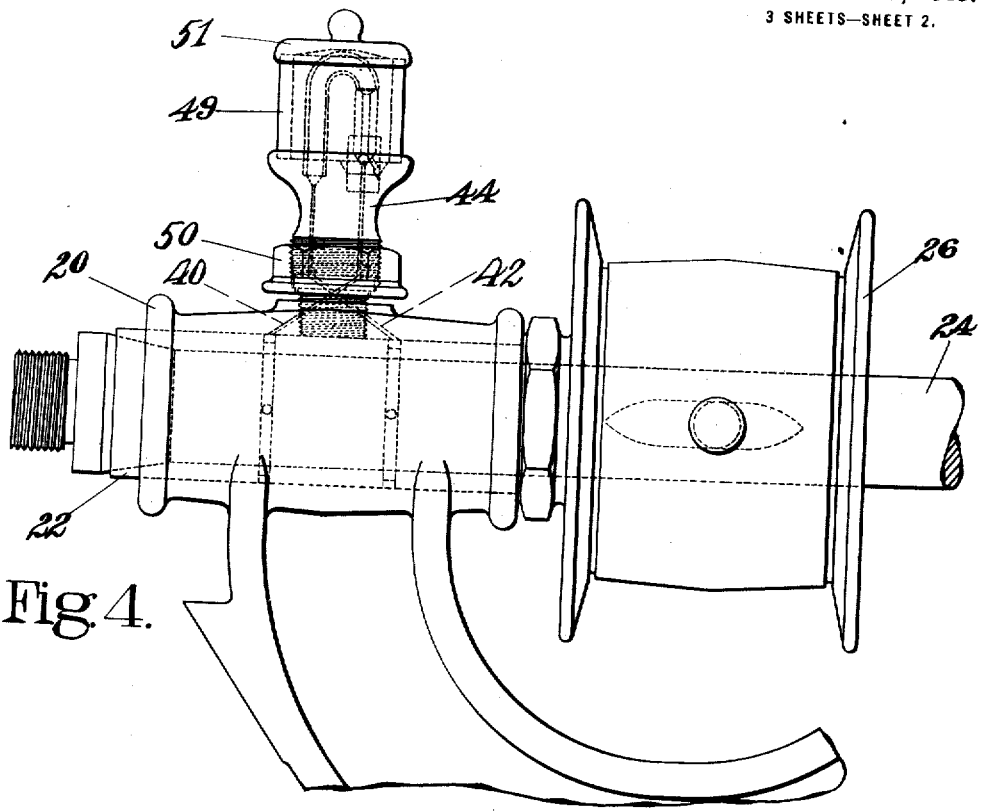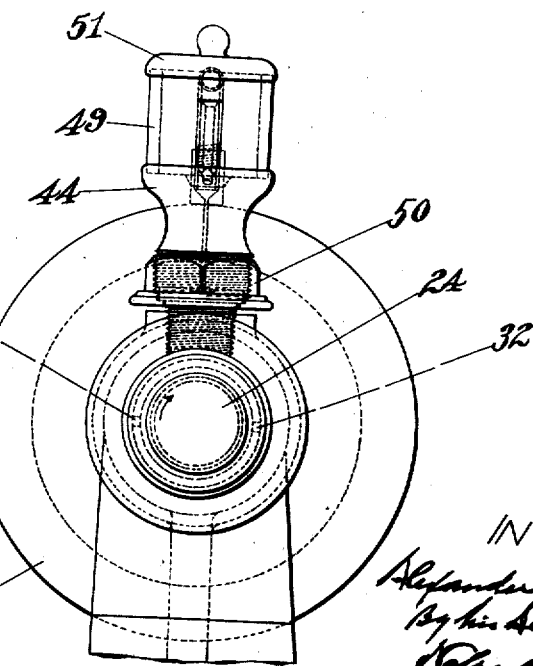

A. M. ALEXANDER.
METHOD OF LUBRICATING FRICTION SURFACES.
APPLICATION FILED MAR. 13, 1912.

1,157,358.

Patented Oct. 19, 1915.
3 SHEETS—SHEET 3.

WITNESSES.
INVENTOR.

UNITED STATES PATENT OFFICE.

ALEXANDER M. ALEXANDER, OF BEVERLY, MASSACHUSETTS, ASSIGNOR TO UNITED SHOE MACHINERY COMPANY, OF PATERSON, NEW JERSEY, A CORPORATION OF NEW JERSEY.

METHOD OF LUBRICATING FRICTION-SURFACES.

1,157,358.  Specification of Letters Patent.  Patented Oct. 19, 1915.

Application filed March 13, 1912. Serial No. 683,411.

*To all whom it may concern:*

Be it known that I, ALEXANDER M. ALEXANDER, a citizen of the United States, residing at Beverly, in the county of Essex and State of Massachusetts, have invented certain Improvements in Methods of Lubricating Friction-Surfaces, of which the following description, in connection with the accompanying drawings, is a specification, like reference characters on the drawings indicating like parts in the several figures.

This invention relates to methods of lubricating friction surfaces.

It is a matter of common knowledge that the function of lubricating materials (hereinafter, for convenience, referred to as oil) is to separate the friction surfaces that otherwise would be in direct contact with each other, and thus to change the frictional resistance from that produced between the surfaces of solids in direct contact with each other to that produced by the surfaces of solids in contact with a film of oil. While it has generally been considered that the best lubrication can be obtained only by flooding the friction surfaces with oil, on the theory that an abundance of oil insures the constant presence between the friction surfaces of the desired film, still it has been demonstrated that under many conditions, as, for instance, where lightly loaded shafts run at moderate or high speeds, better lubrication can be obtained by supplying to the surfaces just enough oil to maintain a thin film between them, while avoiding any excess of oil. Prior to this invention, however, no method, so far as I am aware, has been devised by which this condition could be maintained for any substantial length of time; the attempts in this direction usually resulting in supplying an excess of oil to the friction surfaces. I have found that a current of air or other gas may be utilized to deliver oil to the surfaces to be lubricated in quantities just sufficient to maintain the desired conditions. This method may be practised conveniently by providing a thin film of oil along the walls of a passage leading from an oil supply to the friction surface to be lubricated and causing a current of air to flow along the film toward the friction surface, the air acting frictionally on the film of oil to urge or drag it toward the surface to be lubricated. Furthermore, it has been demonstrated that the relative movement of friction surfaces upon each other produces between them fluid pressures differing considerably at different points on the surfaces. Considering, for example, the common instance of a journal rotating in its bearing, I have found that there exists around the journal for a considerable angular distance a positive pressure varying in intensity at different points, while around another part of the journal a region of negative pressure exists. The present method contemplates the use of these pressure conditions for the purpose of creating a current of gas sufficient to convey lubricating material either in the form of a film, as above mentioned, or otherwise, to the surfaces to be lubricated.

Many forms of apparatus may be devised to operate in accordance with the present method but for the purpose of clearly disclosing the invention I have shown in the accompanying drawings two very simple constructions.

Figures 1, 2:
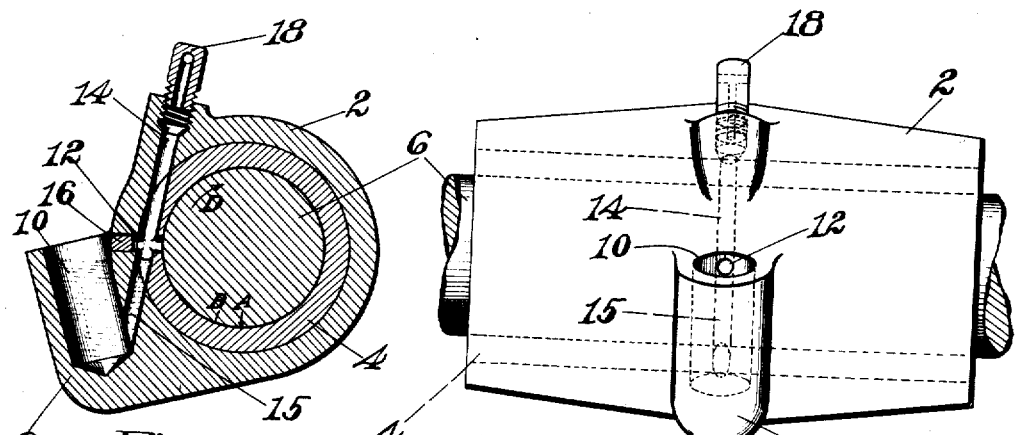
Figure 6:
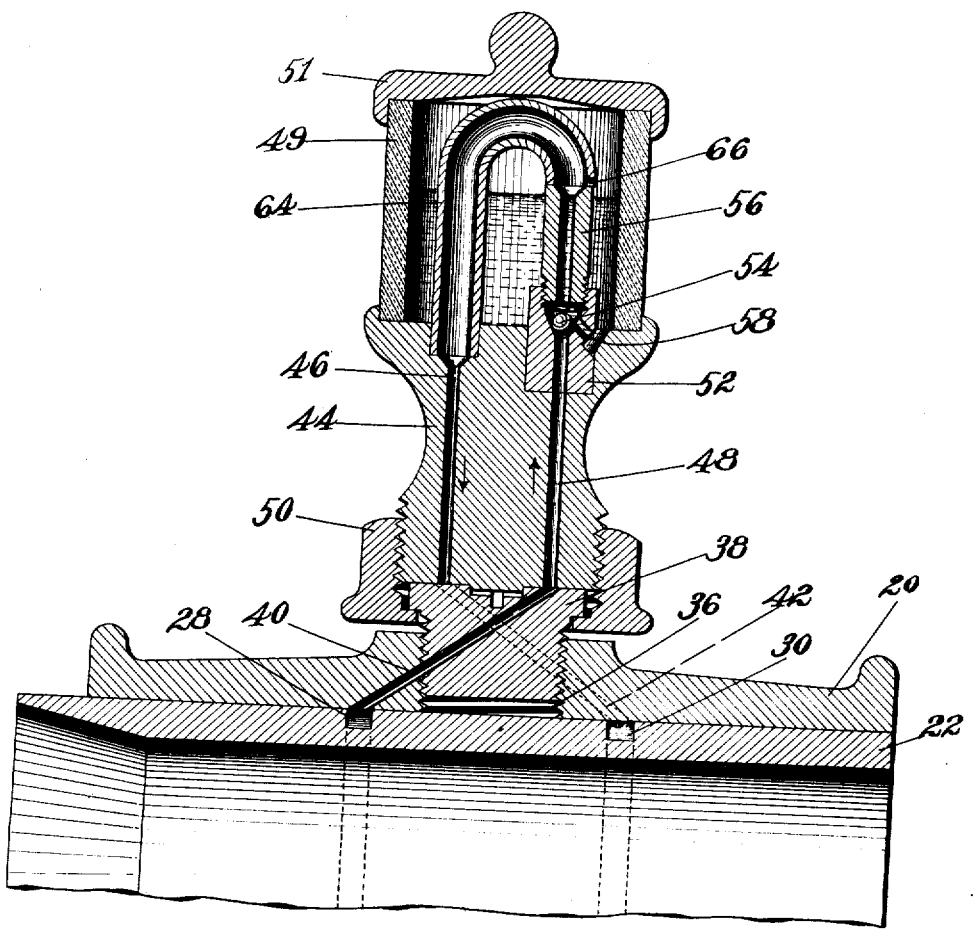

In the drawings, Figure 1 is a view in side elevation of an apparatus by the use of which the method of the present invention may be practised; Fig. 2 is a sectional view of the apparatus shown in Fig. 1; Fig. 3 is a sectional view of an apparatus like that shown in Figs. 1 and 2 but applied to slightly different conditions; Fig. 4 is a side elevation of a different form of apparatus; Fig. 5 is an end elevation of the construction shown in Fig. 4; and Fig. 6 is a central longitudinal sectional view of the apparatus shown in Figs. 4 and 5.

Referring first to Figs. 1 and 2, 2 indicates a bearing having the usual bushing 4 and supporting a shaft 6 for rotative movement. The bearing is provided on one side with a boss 8 in which a hole is drilled to form an oil pocket or reservoir 10. A small hole 12 is drilled through the casting 2 and bushing 4, substantially in or above the level of the axis of the shaft, and another hole, intersecting the hole 12 is drilled downwardly from the top of the casting until it breaks through into the bottom of the reservoir 10, thus forming ducts 14 and 15. The outer end of one of these holes may be plugged, as indicated at 16, although this is not necessary. The outer end of the other hole, however, should be left open; and, in order to prevent its becoming clogged with dirt, this hole may be tapped and a plug 18 threaded thereinto, the plug having small holes drilled through from the sides, where they will be unlikely to become filled with dirt, and opening into the hole 14. It will be evident that the holes 12 and 15 form a continuous oil duct leading from the oil reservoir to a point on the friction surface of the bushing; and that the ducts 12 and 14 afford free communication between said point and the atmosphere. In using the apparatus the oil reservoir is filled, causing the oil to rise in the duct 15 to a point somewhat below the duct 12. The upper edge of the reservoir preferably is so positioned with reference to the ducts that the reservoir can not be filled to such a point that the oil will run through the duct 12 on to the friction surface solely through the influence of gravity. Assuming the shaft to be rotating in the direction indicated by the arrow D in Fig. 2, suction will be created at the point where the duct 12 opens on to the friction surface of the bushing. The lubricating action should be initiated by establishing a film of oil between the friction surface and the surface of the oil in the duct 15. This action may be accomplished by closing the apertures in the plug 18 for an instant, which will cause the oil to flow through the duct 12; or a sufficient film of oil may have been established previously during the machining operations; thus rendering the "priming" operation unnecessary. The suction created by the movement of the shaft 6 will cause a current of air to flow continuously through the duct 14 to its junction with the duct 12 and then along the latter duct to the shaft. This current of air exerts a frictional drag on the film of oil in the duct 12, tending to force or urge it toward the friction surface of the bearing. In this apparatus the oil is delivered to the bearing in exceedingly small quantities, no actual transfer of oil being visible, even in an apparatus constructed to expose all the ducts to view. Yet oil is supplied in sufficient quantities to maintain constantly a thin film between the shaft and the bearing but without providing any excess of oil. After the operation of the apparatus has been initiated by priming, it will continue to operate automatically, starting up when the shaft is started, and stopping when the rotation of the shaft is discontinued, until the oil level drops to such a point that air is admitted through the reservoir to the lower end of the duct 15. The reservoir then should be refilled. Fig. 3 shows the same relative arrangement of ducts and reservoir but applied to a bearing in which a shaft reciprocates axially.

It is important, in an apparatus arranged as above described, to have the oil duct open on to the friction surface of the bearing at a point where negative pressure is created. The distribution of fluid pressure around the journal depends chiefly upon the position of the journal in the bearing, which, in turn, depends upon the direction of rotation of the journal, the direction and intensity of the load which it carries, and the direction and intensity of the force imparted to it by the driving means tending to press it laterally against the friction surface. Referring to Fig. 2, and assuming the shaft 6 to be driven by a belt, the direction of load and direction of belt pull coinciding and both acting to press the shaft against the bearing in the direction indicated by the arrow A, it will be evident that, when the shaft is stationary, the point of maximum positive pressure will be at the point A; but when the shaft is rotated in a clockwise direction and is supplied with lubricating material, the point of maximum pressure will be shifted slightly toward the left to a point, say at B. The amount of this shifting will depend upon the load, belt pull, and speed. Experiments have demonstrated that, at a point less than 90° ahead (in the direction of rotation) of this point of maximum pressure on the "leaving" side of the journal, that is, the side at which the journal passes out of contact with the friction surface, as distinguished from the side at which it runs into contact with the bearing, the pressure changes from positive to negative; and that from this point a region of negative pressure extends for approximately 180° around the journal. Bearing this fact in mind, and remembering the influence that the belt pull, load and direction of rotation have upon the position of the journal in the bearing, the point at which the oil duct 12 should enter the bearing can usually be determined without difficulty. If, however, a particular case presents difficulty because of opposing factors which, perhaps, may vary in intensity at different times as, for instance, where the belt pull is strong and acts at an angle to a variable load, the point at which the oil duct should be brought into the friction surface can be determined by drilling a few test holes and either observing the action when oil is poured into these holes, or by testing the pressure at the holes with any pressure indicating device. It may be desirable to have several oil ducts enter the bearing at different angular positions.

It will be evident that, if the air duct 14 is closed while the shaft is running, the suction created in the duct 12 will cause the oil to flow very rapidly through the duct 15 and the duct 12 into the bearing, draining the reservoir in a few minutes. Under normal running conditions, however, the air duct is left open and affords free communication between the duct 12 and the atmosphere so that the level of the body of oil in the duct 15 is not appreciably affected by the suction.

The rate at which the oil will be delivered to the friction surface may be varied by varying the velocity of the current of air traveling through the duct 12. Obviously the greater the velocity the greater will be the frictional drag exerted upon the film of oil by the air. The more important factors affecting the velocity of the air entering the bearing are, the speed of the shaft, the dimensions of the ducts through which the air travels, the position of the shaft in the bearing with relation to the position of the oil duct entrance, and the difference in diameter of the shaft and bearing. Furthermore, the flow of air may be increased by forming a notch in the shaft opposite the duct 12 or by forming a groove in the bushing 4 across the end of duct 12 and running parallel with the axis of the shaft. The rate of delivery of oil to the shaft also depends upon the size and shape of the oil ducts and the height that the oil must be lifted. Experiments conducted with this apparatus indicate that the oil is drawn up the wall of the duct 15, chiefly through the action of surface tension. The current of air in the duct 12, urging the film along this duct, tends to rupture the film near the upper end of the duct 15, while surface tension, tending to maintain the film unbroken, lifts oil from the main body in the duct 15 and draws it slowly up the walls of the duct, thus replenishing the film in the duct 12. I have found that an apparatus arranged as shown in Figs. 1 and 2, in which this duct is circular in cross-section and approximately one sixteenth of an inch in diameter, operates very satisfactorily. The travel of the oil up the walls of the duct 15 may be aided by roughening the walls or by inserting a rod in the duct partially closing it and providing additional surface upon which the oil film may cling.

Figs. 4, 5 and 6 show an apparatus with the aid of which the method of this invention can be practised and which is designed to utilize the positive, as well as the negative, pressure created between the friction surfaces for the purpose of forcing oil on to these surfaces. This apparatus comprises a bearing 20 having the usual bushing 22 in which a shaft 24 is rotatably supported and may be driven by a belt running over a pulley 26. The bushing 22 has two grooves 28 and 30 formed in its peripheral surface, which grooves may extend entirely around the bushing. A hole 32 is drilled through the bushing from the friction surface into the groove 28 at a point substantially in a horizontal plane passing through the axis of the shaft and another hole 34 is drilled through the opposite side of the bushing connecting the groove 30 with the friction surface. The top of the bearing 20 is drilled and tapped as indicated at 36 to receive a threaded plug 38 having a flanged head and a machined upper face. Ducts 40 and 42 are drilled diagonally through the plug 38 and the bearing 20 and open respectively into the grooves 28 and 30. These ducts, however, do not communicate with each other. Seated upon the machined face of the plug 38 is a stem 44 of an oil cup; and this stem is drilled, as indicated at 46 and 48, to form two ducts designed to communicate respectively with the ducts 42 and 40. The stem is secured to the plug 38 by a nut 50 having threads to engage the threads of the stem and a flanged portion to engage the flange of the plug 38 as shown in Fig. 6. A cylindrical member 49, fitting snugly into a seat formed at the upper end of the stem 44, constitutes the oil cup. This cup may be closed by a cover 51 fitted loosely thereon, and permitting air to enter the cup. The upper end of the stem 44 is recessed to receive a valve plug 52 having a duct extending therethrough to register with the duct 48, the upper portion of this duct being enlarged to provide a seat for a small ball 54, which forms a check valve. The plug 52 is internally threaded to receive the threaded end of a short tube 56 and a duct 58, drilled downwardly from a point above the valve seat, provides communication between the interior of the cup and the bore of the tube 56. The stem 44 also supports a tube 64 which forms a continuation of the duct 46 and at its upper end is curved in substantially the form of an inverted U to communicate with the tube or duct 56. An opening 66 is provided in the tube 64 above the level of the oil to afford access to the atmosphere at this point. If desired, both the tube 64 and the member 49 may be made of glass so that the action of the apparatus may be seen.

It will be evident from the description of the operation of the apparatus shown in Figs. 1 and 2 that, if the shaft 24 in the form of apparatus shown in Figs. 4, 5 and 6 is driven in the same manner as the shaft 6 of Figs. 1 and 2, a positive pressure will be created at the point 32 and a negative pressure, or suction, will be created at the point 34. Furthermore, if all communication through the duct 48 were cut off, the apparatus would then operate substantially as does the apparatus shown in Figs. 1 and 2. Air would be taken in through the opening 66 into the duct 64 and would be carried through the ducts 46 and 42 into the groove 30 to the opening 34. Supposing the oil cup to be filled to a point, for example, as indicated in Fig. 6, causing oil to rise in the tube 56 and assuming a film of oil to have been established between the point 34 and the oil reservoir by priming or otherwise, this film would be carried toward the friction surfaces by the current of air passing through the ducts. The oil, however, would have to be lifted into the range of influence of the current of air in the same manner as in the apparatus shown in Figs. 1 and 2. In the apparatus under discussion, the positive pressure generated between the friction surfaces is utilized to lift oil into the duct 64 against the influence of gravity. When this apparatus is in operation, air is forced by the rotation of the shaft through the aperture 32, the groove 28 and the ducts 40 and 48. lifting the check valve 54 from its seat and passing up through the oil in the duct 56 in the form of bubbles. These bubbles are carried above the surface of the oil into the duct 64. Usually each bubble breaks soon after passing the opening 66 and the oil forming the film of the bubble is carried by the current of air along the ducts 64, 46, 42, 30 and 34 into the bearing. The ball valve 54 prevents oil from flowing down the duct 48. While this apparatus in operation appears to carry oil over into the intake ducts very rapidly, the actual transfer of oil is very slow, since the quantity of oil entrained by each bubble is exceedingly small. It will be evident from the foregoing description that this apparatus differs primarily from that shown in Figs. 1 and 2 in the manner of lifting oil from the reservoir. In the present case a current of air is not only utilized to carry a film of oil along the oil ducts to the friction surfaces, but a current of air also acts directly to lift oil out of the reservoir. In both cases the action of surface tension is utilized. While the arrangement of ducts shown in Figs. 4, 5 and 6 permits gravity to aid in carrying the film of oil toward the friction surfaces, this arrangement is not necessary and the operation of the apparatus would be equally satisfactory if it were so constructed that the current of air would have to urge the film of oil along the oil passage toward the friction surfaces against the influence of gravity. The quantity of oil delivered to the bearing may be regulated by adjusting the stem 44 upon the plug 38 so as to partly cut off communication between the ducts 40 and 48 and 42 and 46. In case the direction of rotation of the shaft is reversed, or the running conditions are otherwise modified so that the direction of flow of the air through the ducts 40 and 42 is reversed, it is merely necessary to turn the stem 44 on the plug 38 through an angle of 180°, thus bringing the duct 46 into communication with the duct 40 and the duct 48 into communication with the duct 42. The apparatus will then operate as above described.

It will be readily understood that the flow of air through the bearing that is produced by this apparatus is directly beneficial in cooling the bearing.

The apparatus disclosed in this application is not claimed herein but is made the subject matter of other applications filed concurrently herewith.

Having thus described my invention, what I claim as new and desire to secure by Letters Patent of the United States is:—

1. That improvement in the art of lubricating friction surfaces which consists in lifting a thin film of oil into a passage leading to the friction surfaces and creating a flow of gas through said passage toward said surfaces.

2. That improvement in the art of lubricating friction surfaces which consists in creating suction at a point between the friction surfaces to be lubricated, providing a film of oil between said point and an oil supply and affording free communication between said point and a gas supply.

3. That improvement in the art of lubricating friction surfaces which consists in creating suction at a point between the friction surfaces to be lubricated, utilizing the suction so created to force oil on to said surfaces and supplying air freely to said point.

4. That improvement in the art of lubricating friction surfaces which consists in causing a current of gas to urge a thin film of oil toward the surfaces to be lubricated and utilizing surface tension to lift the oil into the range of action of said current of gas to replenish said film.

5. That improvement in the art of lubricating friction surfaces which consists in providing a film of oil along the wall of a restricted passage between the friction surface and an oil supply and causing a current of air to flow along said film from a point above the oil supply to the friction surface and thereby to urge said film toward said surface.

6. That improvement in the art of lubricating friction surfaces which consists in establishing communication between the atmosphere and a point between the friction surfaces, providing a passage between said point and an oil supply through a portion of which passage the oil must be urged against the influence of gravity and creating suction at said point.

7. That improvement in the art of lubricating friction surfaces which consists in providing a passage between the atmosphere and a point between the friction surfaces, affording restricted communication between said passage and an oil supply positioned at a lower level than portions of the passage, and creating suction at said point thereby establishing a film of oil between the supply and said passage and along the wall of said passage to the friction surfaces.

8. That improvement in the art of lubricating friction surfaces which consists in providing a passage between the atmosphere and a point between the friction surfaces to be lubricated, creating suction at said point and utilizing the pressure created at another point between said friction surfaces to force oil into said passage.

9. That improvement in the art of lubricating friction surfaces which consists in utilizing the difference in fluid pressures created at different points between the friction surfaces to cause a flow of gas through a passage leading to the friction surfaces; affording communication between said passage and a gas supply, and providing communication between said passage and an oil supply located at a lower level than portions of said passage.

10. That improvement in the art of lubricating friction surfaces which consists in providing a passage connecting points between the friction surfaces at which different fluid pressures are created, providing access between said passage and an oil supply and establishing communication between said passage and the atmosphere at a point between said oil supply and the point on the friction surface at which the oil is delivered.

In testimony whereof I have signed my name to this specification in the presence of two subscribing witnesses.

ALEXANDER M. ALEXANDER.

Witnesses:
JOHN H. McCREADY,
ELMER B. GRUSH.

Correction in Letters Patent No. 1,157,358.

It is hereby certified that in Letters Patent No. 1,157,358, granted October 19, 1915, upon the application of Alexander M. Alexander, of Beverly, Massachusetts, for an improvement in "Methods of Lubricating Friction-Surfaces," an error appears in the printed specification requiring correction as follows: Page 4, line 98, claim 4, after the word "tension" insert the words *of the oil;* and that the said Letters Patent should be read with this correction therein that the same may conform to the record of the case in the Patent Office.

Signed and sealed this 21st day of March, A. D., 1916.

[SEAL.]

J. T. NEWTON,

*Acting Commissioner of Patents.*

Cl. 64—24.